(12) United States Patent
De Pasquale et al.

(10) Patent No.: US 8,345,531 B2
(45) Date of Patent: Jan. 1, 2013

(54) SELECTING A TRANSMISSION TECHNOLOGY

(75) Inventors: Andrea De Pasquale, Madrid (ES);
Kyriakos Exadaktylos, Madrid (ES);
Esperanza Alcazar Viguera, Madrid (ES); Maria Diaz Mateos, Madrid (ES);
Beatriz Garriga Muñiz, Madrid (ES);
Francisco Javier Dominguez Romero, Madrid (ES); Brendan McWilliams, Madrid (ES); Julio Urbano Ruiz, Madrid (ES); Clara Serrano Solsona, Madrid (ES); Javier López Roman, Madrid (ES); Aitor García Viñas, Madrid (ES); Santiago Tenorio Sanz, Madrid (ES); Yannick Le Pezennec, Madrid (ES)

(73) Assignee: Vodafone Group PLC, Newbury, Berkshire (GB)

( * ) Notice: Subject to any disclaimer, the term of this patent is extended or adjusted under 35 U.S.C. 154(b) by 289 days.

(21) Appl. No.: 12/831,442

(22) Filed: Jul. 7, 2010

(65) Prior Publication Data

US 2011/0019629 A1    Jan. 27, 2011

(30) Foreign Application Priority Data

Jul. 7, 2009   (ES) .................................. 200930420

(51) Int. Cl.
| | |
|---|---|
| *H04L 5/04* | (2006.01) |
| *H04J 11/00* | (2006.01) |
| *H04L 12/26* | (2006.01) |
| *H04W 4/00* | (2009.01) |
| *H04W 36/00* | (2009.01) |
| *H04W 24/00* | (2009.01) |

(52) U.S. Cl. ........ 370/204; 370/230; 370/241; 370/334; 455/436; 455/456.3

(58) Field of Classification Search .......... 370/203–210, 370/230, 235, 241, 310–350; 455/432.1–444, 455/446–458
See application file for complete search history.

(56) References Cited

U.S. PATENT DOCUMENTS

| | | | | |
|---|---|---|---|---|
| 8,027,367 | B2 * | 9/2011 | Li et al. | 370/491 |
| 8,045,644 | B2 * | 10/2011 | Yokoyama | 375/299 |
| 2008/0240030 | A1 * | 10/2008 | Kolding et al. | 370/329 |
| 2009/0028103 | A1 * | 1/2009 | Wang et al. | 370/329 |
| 2009/0034639 | A1 | 2/2009 | Hwang et al. | |
| 2009/0086648 | A1 | 4/2009 | Xu et al. | |
| 2009/0175369 | A1 * | 7/2009 | Atarashi et al. | 375/260 |
| 2009/0232243 | A1 * | 9/2009 | Tsuboi et al. | 375/267 |
| 2009/0267842 | A1 | 10/2009 | Takagi et al. | |

(Continued)

OTHER PUBLICATIONS

Spanish Search Report in Corresponding Espana Application No. 2 358 406.

(Continued)

*Primary Examiner* — Tri H Phan
(74) *Attorney, Agent, or Firm* — B. Aaron Schulman, Esq.; Stites & Harbison, PLLC

(57) ABSTRACT

The present invention discloses a method for selecting a transmission technology (MIMO or non MIMO) for a HSDPA connection established between a RNC and a UE depending on the mobility of said UE, measured at the RNC as variations of the position of the UE. Then, if the connection is established with HSDPA MIMO technology and the position variations exceed a first pre-defined threshold, the connection is switched to HSPDA non MIMO technology. Also, if the connection is established with HSPDA non MIMO technology and the position variations are below a second pre-defined threshold, the connection is switched to HSPDA MIMO technology.

9 Claims, 3 Drawing Sheets

U.S. PATENT DOCUMENTS

| | | | |
|---|---|---|---|
| 2009/0274230 A1* | 11/2009 | Heath et al. .................... | 375/260 |
| 2010/0113048 A1* | 5/2010 | Sawahashi et al. ........... | 455/450 |
| 2010/0118784 A1 | 5/2010 | Goransson et al. | |
| 2010/0232384 A1* | 9/2010 | Farajidana et al. ........... | 370/329 |
| 2010/0296487 A1* | 11/2010 | Karaoguz et al. ............. | 370/332 |

OTHER PUBLICATIONS

3rd Generation Partnership Project; Technical Specification LTE;Evolved Universal Terrestrial Radio Access (E-UTRA);User Equipment (UE) procedures in idle mode (3GPP TS 36.304 version 8.4.0 Release 8); 3rd Generation Partnership Project (3GPP), Mobile Competence Centre; 650, route des Lucioles; F-06921 Sophia-Antipolis Cedex; France. Jan. 31, 2009, Epigrafe 5.2.

Saeed et al., "Mobility Estimation for Wireless Networks using Round Trip Time (RTT)". 2007. 6th International Conference on Information, Communications & Signal Processing, 2007 IEEE Piscataway, NJ, USA. Dec. 2, 2008, ISBN 978-1-4244-0983-9. Todo el documento.

\* cited by examiner

SELECTING A TRANSMISSION TECHNOLOGY

FIELD OF THE INVENTION

The present invention has its application within the telecommunications sector and relates to a radio network controller and method for selecting a transmission technology for a HSDPA connection. In particular the invention relates to the provision of Radio Access Networks (RANs) with elements of cellular infrastructures such as Radio Network Controllers (RNCs) and Base Stations (Nodes B) for wireless communications systems.

More specifically, it relates to wireless communications systems supporting both MIMO and non-MIMO variants of HSDPA technologies.

BACKGROUND OF THE INVENTION

Related Art

HSDPA (High Speed Downlink Packet Access) is a packet-based data service in the 3rd generation W-CDMA (Wideband Code Division Multiple Access) systems, which provides high-speed data transmission (with different download rates according to the HSDPA technology step e.g. 7.2/10.8/16.2/21.6/28.8 Mbps over a 5 MHz bandwidth) to support multimedia services.

In order to reach the higher peak rates (up to 21.6 or 28.8 Mbps with 3GPP Release), the MIMO (Multiple Input Multiple Output) feature is used in HSDPA, in which multiple antennas are implemented at both base station (Node B) and mobile terminals (UE: User Equipment). The basic MIMO feature as standardised in 3GPP Release 7 is based on two transmitter antennas (at the node B) and two receiving antennas (at the UE). At the transmitter, the transmitted data is divided into 2 data streams and transmitted through the two antennas using the same radio resource (same time i.e. Transmission Time Interval and HSDPA codes). The two streams of data are recovered by the UE from the signals received via its 2 antennas (Rx Diversity). Thus, the MIMO feature needs support in MIMO-enabled terminals as well as in the network. In order to deploy MIMO, two power amplifiers are required per sector (one for each of the two antennas). In order to not use an entire carrier for MIMO only (5 Mhz), it is more efficient and practical to share the same carrier as non-MIMO devices e.g. HSDPA legacy terminals to utilise all available capacity.

MIMO technology is an important step in the evolution of HSDPA, as it provides higher data rates in downlink whilst further improving spectrum efficiency.

However, the performance of MIMO as a whole has been shown to worsen considerably when the user (i.e. MIMO device) is not static, this effect being much more significant than what could be observed in a legacy HSPDA device in a similar non-static scenario. This phenomenon is due to the closed loop characteristics of the MIMO technology and its high sensitivity to changes in the correlation between the MIMO channels resulting from the propagation in the mobile channel. The closed loop mechanism used in MIMO consists in adapting a set of precoding weights used by the Node B for the dual stream transmission to be successful based on recommended weights fed back by the UE. This performance worsening means lower transmission bitrates for a given connection, undermining in some cases the advantages of MIMO over HSPDA (non-MIMO).

Thus, in scenarios with both static and moving users, systems which use MIMO technologies whenever possible are losing efficiency due if not adapting the type of transmission mode (MIMO, non-MIMO) to the user speed.

SUMMARY OF THE INVENTION

The current invention solves the aforementioned problems by disclosing a method that dynamically chooses between MIMO and non-MIMO HSPDA technologies individually for every User Equipment (UE) connected to a Radio Network Controller (RNC), depending on position variations of the UE, measured at the RNC.

If HSDPA MIMO technology is being used for the connection with a UE, and the RNC detects that said UE is currently moving at a speed that degrades MIMO performance, the RNC switches the connection to HSPDA non MIMO. This is achieved by, if the connection is established by means of HSDPA MIMO technology, comparing the position variations of the UE with at least a first predefined threshold. Then, if the connection is established by means of HSDPA MIMO technology and the position variations of the UE exceed the at least first predefined threshold, the RNC switches the connection to HSPDA non MIMO technology.

Also, if HSPDA non MIMO technology is being used for the connection with the UE, and the RNC detects that the position of said UE is static enough to allow a good MIMO performance, the RNC switches the connection to HSDPA MIMO. This is achieved by, if the connection is established by means of HSPDA non MIMO technology, comparing the position variations of the UE with a second predefined threshold. Then, if the connection is established by means of HSPDA non MIMO technology and the position variations of the UE are below the second predefined threshold, the RNC switches the connection to HSPDA MIMO technology.

Preferably, in order to measure the variations of the UE position, one or both of the following sources of information is used:
  Number of cell changes of the UE, that is, the number of times that the cell serving the UE changes. As these changes are event-triggered according to the position of the UE, it provides a rough estimation of the mobility of the UE (that is, whether the UE is static or moving).
  Round Trip delay Time (RTT), measured by the serving base station and periodically reported to the RNC. The RTT represents the time needed by a signal to be transmitted from the base station to the UE and transmitted back from the UE to the base station, thus providing information about the distance between base station and UE. Variations in the distance between base station and UE mean variations in the position of the UE, and thus, a higher UE mobility. Preferably, RTT measures are filtered with a low pass filter in order to prevent transitory effects (i.e. instant fading) from being interpreted as UE movement. This filter additionally serves as a way to reduce the impact of possible lacks of accuracy in the RTT measurements.

In another aspect of the invention, a Radio Network Controller which is configured to perform the described method is disclosed. To that end, the RNC is capable of establishing a connection with a UE, where both the RNC and the UE are capable of supporting MIMO and non MIMO HSPDA technologies. The Radio Network Controller comprises:
  Measuring means configured for measuring position variations of the UE.
  Comparing means configured for comparing the position variations of the UE with a first or second threshold, depending on the technology used for the connection as described for the method of the invention.

Switching means configured to switch the technology of the invention according to the results of the comparison, as described for the method of the invention.

A major advantage of the present invention is that it allows to tune networks deployed with MIMO capabilities for scenarios where both static and moving users are present, providing an optimized quality of service to both of them.

BRIEF DESCRIPTION OF THE DRAWINGS

For the purpose of aiding the understanding of the characteristics of the invention, according to a preferred practical embodiment thereof and in order to complement this description, the following figures are attached as an integral part thereof, having an illustrative and non-limiting character.

DETAILED DESCRIPTION OF THE INVENTION

The matters defined in this detailed description are provided to assist in a comprehensive understanding of the invention. Accordingly, those of ordinary skill in the art will recognize that variation changes and modifications of the embodiments described herein can be made without departing from the scope and spirit of the invention. Also, description of well-known functions and elements are omitted for clarity and conciseness.

Note that in this text, the term "comprises" and its derivations (such as "comprising", etc.) should not be understood in an excluding sense, that is, these terms should not be interpreted as excluding the possibility that what is described and defined may include further elements, steps, etc.

Figure 1:
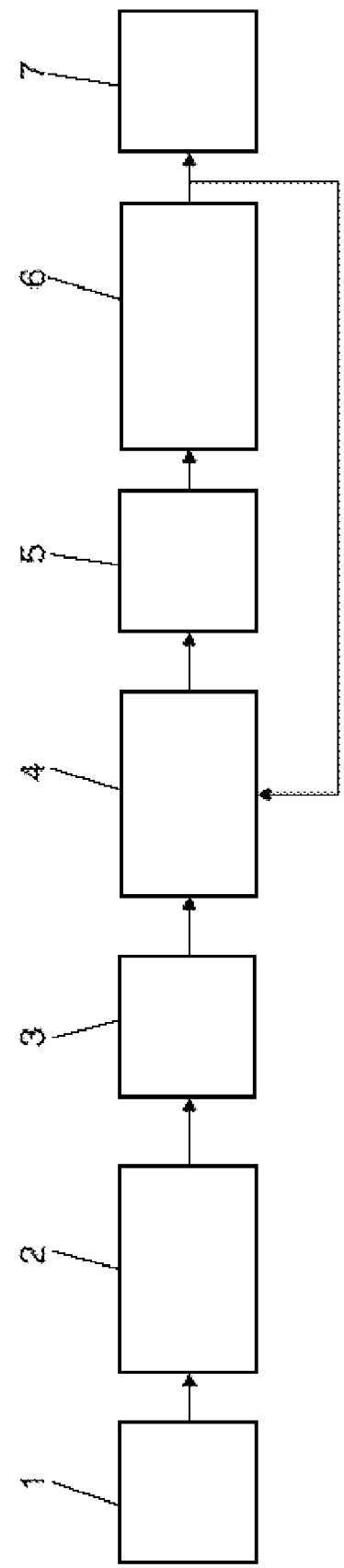
FIG. 1 shows a flowchart of a preferred embodiment of the method of the invention.

FIG. 1 shows a preferred embodiment of the method of the invention, all its steps being carried out by a Radio Network Controller. When starting 1 a connection between a UE and a RNC starts, a pre-defined default mode (MIMO or non MIMO HSPDA) is assigned 2 to the connection, establishing 3 the connection according to the default mode. Then, after the connection is established, position variations of the UE are periodically measured 4 at the RNC, thus gauging the mobility of the UE, that is, whether the UE is static or moving, and in the latter case, the magnitude of its movement.

To measure the variations in the mobility of the UE, two techniques are combined:

Number of cell changes (e.g. HSDPA serving cell change) over a period of time, that is, the number of times that the UE HSDPA connection is handed over from current serving cell of a base station to another serving cell from the same or another base station. As these cell changes are highly related to the mobility of the UE, the frequency of the cell changes provides an estimate of the mobility of the UE. As the accuracy of the estimate depends on the occurrences of the cell changes, the estimate in low mobility scenarios is rougher than in in high mobility scenarios.

RTT measurements, which provide continuous information about the movements of the UE as the RTT is highly correlated with the distance between a base station and the UE. The variations of the RTT of the UE are thus observed as a way to assess the mobility of the user.

Figure 2:
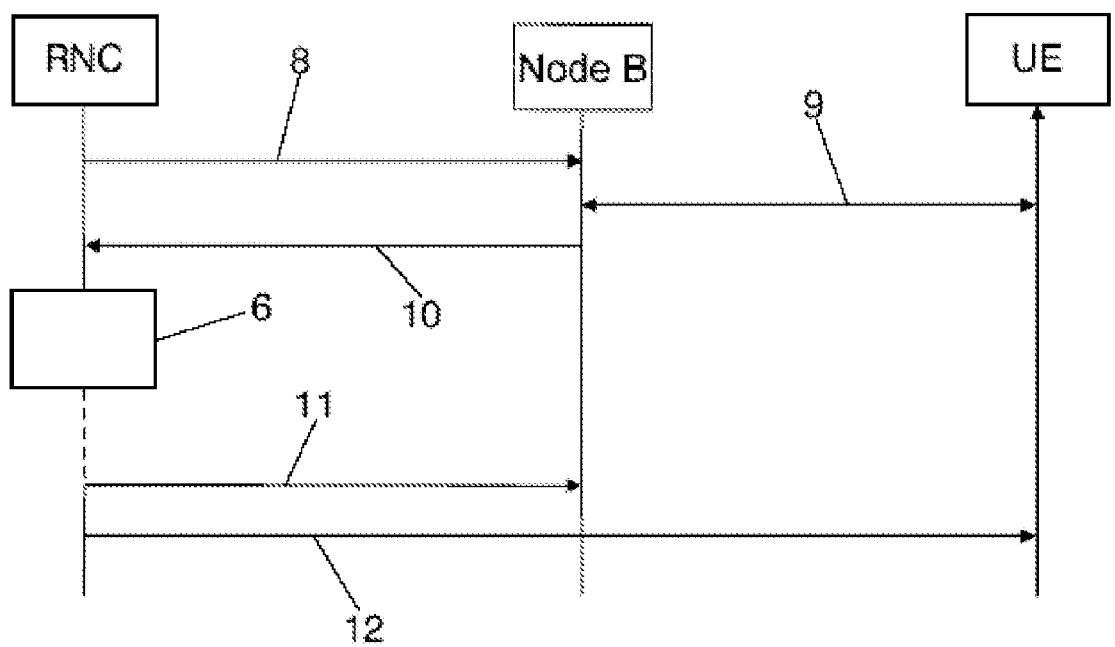
FIG. 2 shows in further detail the process of measuring and reporting the RTT of a connection, as well as the process of switching the technology of the connection.

FIG. 2 shows the process involved in the RTT measurements. This measurement is set up 8 by the RNC, which requires the serving cell from the base station to perform periodic measurements 9 of RTT for a given UE. These measurement samples are periodically reported 10 to the RNC, and filtered by the RNC in order to derive an estimate of the user mobility whilst smoothing transitory and accuracy effects in the RTT measurements.

FIG. 2 also shows the commands sent by the RNC to the UE and Node B when a switching 6 from HSPDA non MIMO to HSPDA MIMO, or from HSDPA MIMO to HSPDA non MIMO, is performed according to the algorithm described further in this section. These commands comprise a first reconfiguration request 11 for the Node B, and a second reconfiguration request 12 for the UE.

Figure 3:
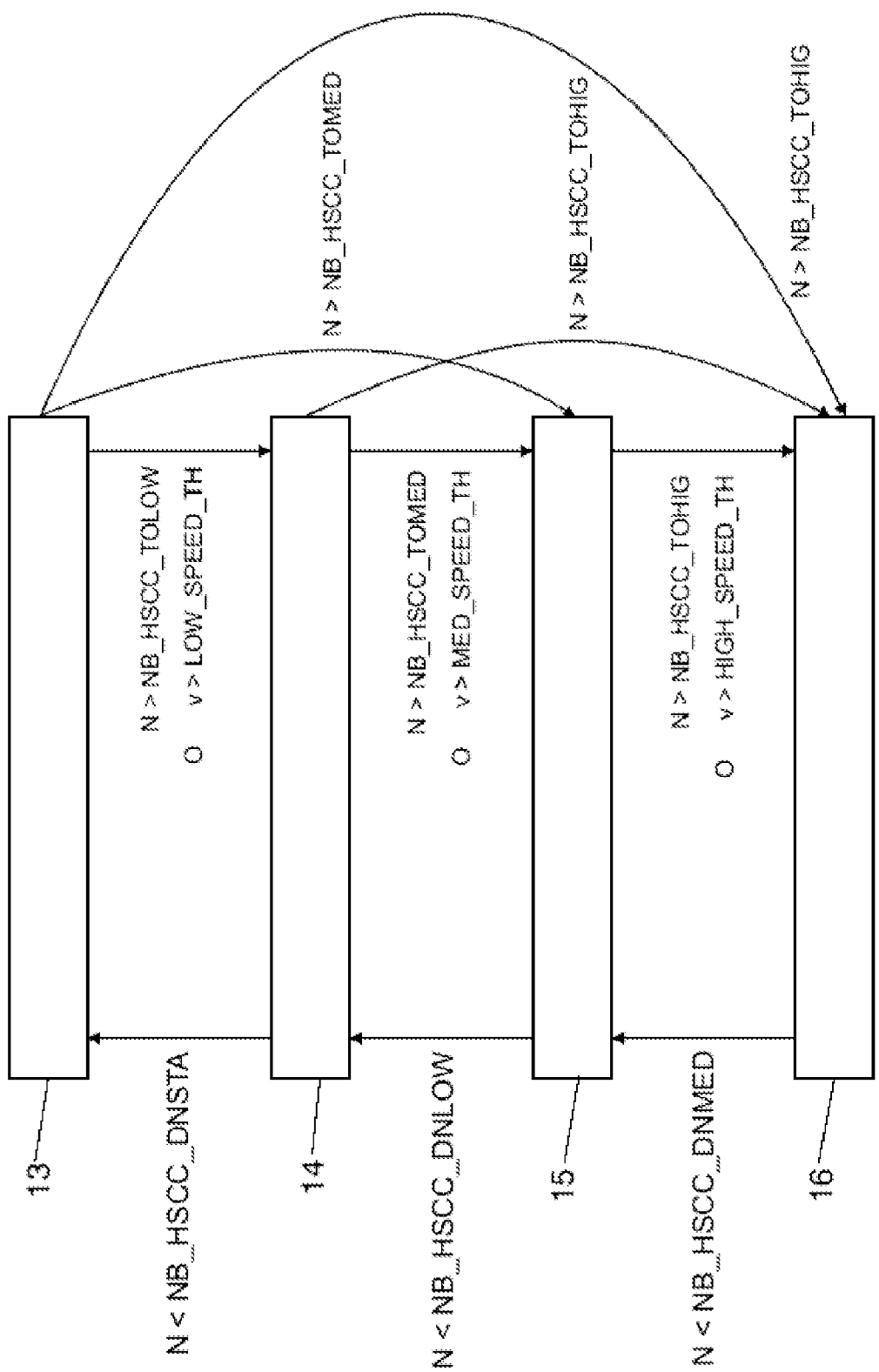
FIG. 3 presents a possible classification of the states of a UE according to its position variations, and the possible changes between states, according to a preferred embodiment of the invention.

According to the measured mobility of the UE, the UE is assigned 5 to one of a number of mobility classes (static, low, medium and high), as shown on FIG. 3. These mobility classes determine the optimal technology to use for the HSDPA connection (e.g. MIMO/non-MIMO) depending of the current mobility state of the UE, switching 6 the technology if necessary. The class assignation is periodically updated according to the aforementioned measurements, until finalizing 7 the connection.

The preferred embodiment uses the following classes and decision rules, although different classifications and rules can be used alternatively within the scope of the invention:

STATIC (13): this class refers to UEs with little or no movement, which can benefit from the full potential of MIMO technology. Connections can be established with full-MIMO (i.e. dual stream MIMO is achievable when in good radio conditions), which allows the highest throughput and is the most sensitive configuration.

A UE in the static class state transits respectively to the low (14), medium (15) or high (16) class state when the number of HSDPA cell change events (N) observed during the predefined time window HSCC_TIMEWINDOW exceeds the corresponding predefined cell changes thresholds (respectively NB_HSC_TOLOW, NB_HSC_TOMED, NB_HSC_TOHIG). The transition from static to low mobility class state can also be triggered when the speed estimate (v) from the RTT measurement process exceeds the corresponding predefined RTT speed threshold LOW_SPEED_TH.

LOW (14): this mobility class state refers to users moving at pedestrian speeds to low vehicular speeds (e.g. between 3 and 20 km/h). Connections can either be established with full MIMO or single stream MIMO according to a predefined parameter configurable by the operator (this parameter can be, for example, adjusted individually to each cell, or be manually modified according to the evolution of the performance of MIMO UE receivers as technology improves).

A UE in the low (14) mobility class state can transit to medium (15) or high (16) mobility classes similarly as described above when the number of HSDPA cell changes events (N) observed during the time window exceeds the relevant thresholds (NB_HSC_TOMED, NB_HSC_TOHIG). The UE could also transit to the medium (15) mobility class based on the RTT speed estimate (v) exceeding the predefined threshold for the medium class (MED_SPEED_TH).

A UE in low (14) mobility class state can also transit back to the static (13) case when the number of HSDPA cell change events (N) observed the predefined time window HSC-C_TIMEWINDOW is lower than the predefined threshold NB_HSCC_DNSTA.

The reason for having a static and a low mobility class is that due to the high sensitivity of MIMO to speed, even a pedestrian user could see substantial impact to its performance hence it is beneficial to discriminate between static and low mobility class to allow a different configuration of the MIMO connection or even to disable MIMO if desired.

MEDIUM (15): this mobility class refers to users moving at medium speeds, typically vehicular speeds in urban and suburban environments (e.g. between 20 and 100 km/h). HSDPA Connections are established in either MIMO or non-MIMO mode according to another predefined parameter, which provides the operator a higher flexibility as described for the low mobility class.

A UE in the medium (15) mobility class state can transit to high (16) mobility classes similarly as described above when the number of HSDPA cell changes events (N) observed during the time window exceeds the NB_HSC_TOHIG threshold. The UE could also transit to the high (16) mobility class based on the RTT speed estimate (v) exceeding the predefined threshold for the medium class (HIGH_SPEED_TH).

A UE in medium (15) mobility class state can also transit back to the low (14) mobility case when the number of HSDPA cell change events (N) observed the predefined time window HSCC_TIMEWINDOW is lower than the predefined threshold NB_HSCC_DNLOW.

HIGH (16): this mobility class refers to users moving at high speeds typically motorway or train speeds (e.g. above 100 km/h). HSDPA Connections are established in non-MIMO mode.

A UE in high (16) mobility class state can only transit back to medium (15) mobility class when the number of HSDPA cell change events (N) observed during the predefined time window HSCC_TIMEWINDOW is lower than the predefined threshold NB_HSCC_DNMED.

Note that the definition of the static/low/medium/high mobility classes is fully configurable by the operator according to the predefined parameters, hence the operator can adapt accordingly the speed range covered by these classes. Additionally, other classifications can be used to implement the present invention, using, for example, a different number of mobility classes.

The invention claimed is:

1. Method for selecting a transmission technology for a HSDPA connection established between a Radio Network Controller and a User Equipment, the User Equipment having a serving base station and a serving cell assigned, wherein both the Radio Network Controller and the User Equipment support both HSDPA MIMO technology and HSDPA non MIMO technology, characterised in that the method comprises the steps of:
  (i) measuring by the Radio Network Controller position variations of the User Equipment;
  (ii) if the connection is established by means of HSDPA MIMO technology, comparing by the Radio Network Controller the position variations with, at least one, first pre-defined threshold;
  (iii) if the connection is established by means of HSPDA non MIMO technology, comparing by the Radio Network Controller the position variations with, at least one, second pre-defined threshold;
  iv) if the connection is established by means of HSDPA MIMO technology and if the position variations exceed the, at least one, first pre-defined threshold, switching by the Radio Network Controller the connection to HSPDA non MIMO technology;
  v) if the connection is established by means of HSPDA non MIMO technology and if the position variations are below the, at least one, second pre-defined threshold, switching by the Radio Network Controller the connection to HSDPA MIMO technology.

2. Method according to claim 1 characterised in that steps (i) to (iii) are performed periodically during the connection.

3. Method according to claim 1 characterised in that step (i) comprises measuring a number of times that the assigned serving cell of the User Equipment changes during a period of time.

4. Method according to claim 1 characterised in that step (i) comprises using information of variations of Round Trip delay Time of the connection to measure the position variations of the User Equipment, being said Round Trip delay Time periodically reported to the Radio Network Controller by the serving base station.

5. Method according to claim 4 characterised in that the information of variations of Round Trip delay Time is filtered by the Radio Network Controller using a filter to eliminate transitory effects.

6. Radio Network Controller in a radio network capable of establishing a connection with at least a User Equipment and of assigning a serving base station and a serving cell station to the User Equipment, wherein both the Radio Network Controller and the User Equipment support both HSDPA MIMO technology and HSDPA non MIMO technology, characterised in that the Radio Network Controller comprises:
  measuring means configured for measuring position variations of the User Equipment;
  comparing means configured for:
    if the connection is established by means of HSDPA MIMO technology, comparing the position variations with, at least one, first pre-defined threshold;
    if the connection is established by means of HSPDA non MIMO technology, comparing the position variations with, at least one, second pre-defined threshold;
  switching means configured for:
    if the connection is established by means of HSDPA MIMO technology and if the position variations exceed the, at least one, first pre-defined threshold, switching the connection to HSPDA non MIMO technology;
    if the connection is established by means of HSPDA non MIMO technology and if the position variations are below the, at least one, second pre-defined threshold, switching the connection to HSDPA MIMO technology.

7. Radio Network Controller according to claim 6 wherein the measuring means measure a number of times that the assigned serving cell of the User Equipment changes during a period of time, using this measured number of times to measure position variations of the User Equipment.

8. Radio Network Controller according to claim 6 characterised by further comprising requesting means configured for requesting the serving base station to periodically report to the Radio Network Controller the Round Trip delay Time of the connection, and in that the measuring means are also configured for using variations in the Round Trip delay Time to measure the position variations of the User Equipment.

9. Radio Network Controller according to claim 6 characterised by further comprising a filter for eliminating transitory effects configured for filtering the variations of the Round Trip delay Time.

* * * * *